United States Patent [19]
Wilson et al.

[11] Patent Number: 5,604,167
[45] Date of Patent: Feb. 18, 1997

[54] Y5V DIELECTRIC COMPOSITION

[75] Inventors: James M. Wilson; Thallam T. Srinivasan, both of Victor, N.Y.

[73] Assignee: Ferro Corporation, Cleveland, Ohio

[21] Appl. No.: 543,273

[22] Filed: Oct. 16, 1995

[51] Int. Cl.$^6$ ................................................. C04B 35/46
[52] U.S. Cl. ............................................... 501/138
[58] Field of Search .................................... 501/138

[56] References Cited

U.S. PATENT DOCUMENTS 5,361,187  1/1994  Srinivasan ........................ 361/321.1

FOREIGN PATENT DOCUMENTS 0247920  2/1987  European Pat. Off. ........ C04B 35/46

*Primary Examiner*—David Brunsman
*Attorney, Agent, or Firm*—Shlesinger, Fitzsimmons & Shlesinger

[57] ABSTRACT

A barium titanate host material $(Ba_xCa_y)$, $(Ti_zSn_w)O_3$ including a small amount of PbO (approximately 0–2.0 wt. %) is doped with small amounts of a lead boro alumino silicate frit, and one or more of boric acid and the oxides of La, Zn, Cu, Nb, Mn and Y, thereby resulting in a dielectric ceramic composition particularly suitable for making low fired multilayered capacitors exhibiting Y5V characteristics and high dielectric constants in the range of 11,000 to 14,000.

5 Claims, No Drawings

Y5V DIELECTRIC COMPOSITION

BACKGROUND OF THE INVENTION

This invention relates to dielectric compositions, and more particularly to an improved high dielectric constant low fire composition capable of achieving the EIA rating of Y5V.

The U.S. Pat. No. 5,361,187, which is assigned to the same assignee as the present application, discloses ceramic dielectric compositions which are capable of meeting both Z5U and Y5V standards or ratings determined by the U.S. Electronics Industries Association (EIA). Such compositions are particularly suitable for use in the manufacture of high dielectric constant multi-layer ceramic capacitors (MLCC's) which have very high insulation resistance capacitance (RC), for instance above about 10,000 ohmfarads at 25° C., and above about 1,000 ohm-farads at 85° C. Moreover, for those compositions having Y5V rating the temperature coefficient of capacitance (TCC) characteristics are within +22 to –82% over a temperature range of –30° to 85° C.

Referring to Table III in the above-noted U.S. patent, it will be noted that multi-layer ceramic capacitors made from samples 1 to 12 and 40 exhibited Y5V characteristics. These characteristics were achieved by adding various combinations of dopants, such as oxides of Y, La, Zr, Nb and Mn to variations of a base formulation $(Ba_{1-x}Ca_x)(Ti_{1-y-z}SnyZrz)O_3$. Notably, however, the compositions disclosed in the above-noted patent are high fire formulations which do not include any low melting point glass frit or network formers such as $SiO_2$, $B_2O_3$ and $GeO_2$, nor do they employ any low melting elements such as lead, lithium and bismuth. However, there is a need for providing a low fire Y5V type dielectric material which not only will maintain the Y5V characteristics, but also will exhibit a high dielectric constant ($K_{RT}$).

It is an object of this invention heretofore, to provide an improved dielectric composition which not only maintains Y5V characteristics, but likewise constitutes a relatively low fire dielectric material which is capable of exhibiting a very high dielectric constant.

A further object of this invention is to provide a novel Y5V dielectric composition having incorporated therein glass network forming elements such as $SiO_2$, $GeO_2$ and $B_2O_3$, and/or low melting elements such as lead, lithium and bismuth.

A more specific object of this invention is to provide an improved Y5V dielectric material which has incorporated therein a low melting glass composition, such as for example a lead boro alumino silicate frit that is produced by Ferro Corporation under the designation Ferro EGD2765.

Other objects of the invention will be apparent hereinafter from the specification and from the recital of the appended claims.

SUMMARY OF THE INVENTION

A low fireable (1120°–1130° C.) high dielectric constant (11,000–14,000) barium titanate based Y5V dielectric composition is produced by doping a modified barium titanate host material, which contains a small amount of lead oxide (PbO), with a mixture containing small amounts of a glass frit (lead boro alumino silicate) and one or more of La, Zn, Cu, Nb, Mn, Y and boric acid.

Due to the excess large cation stoicheometry employed in the host material, and the presence of $Pb^{+2}$ and $Ca^{+2}$ in the same, it is thought that lead from the glass frit is incorporated into perovskite lattice structures, forcing $Ca^{+2}$ to occupy interstitial sites. In turn, this "reactive sintering" reduces the volume fraction of low dielectric constant glass phase and drives cation balance back toward a stoicheometric condition. This results in sufficient grain growth to generate here-to-for never achieved high dielectric constants in barium titanate based low fire dielectric compositions.

DETAILED DESCRIPTION OF THE PREFERRED EMBODIMENTS

The barium titanate based material made according to this invention is made by using barium (Ba), calcium (Ca), titanium (Ti) and tin (Sn) compounds along with a small amount of lead oxide, for example in the range of approximately 2 weight percent (wt. %) of the host. More specifically, a host material in the form of $(Ba_x Ca_y)(Ti_z Sn_w)O_3$, wherein the molar ratio of (x+y) to (z+w) is greater than one, wherein the mole fraction of x is in the approximate range of 0.90 to 0.92 of x+y and the mole fraction of z is in the approximate range of 0.86 to 0.89 of z+w, has added thereto lead oxide in the amount of t wt. % PbO. Moreover, x+y equals approximately 1.03 moles; z+w equals 1 mole; and t equals greater than approximately 0 to 2 wt. %. This host material contains excess Ba; and Pb is similar in ionic size to the Ba. For this reason it is believed possible that the Pb may enter into the perovskite structure by removing Ca ions. These removed or displaced Ca ions may occupy the interstitial sites.

In practice the above-noted host material is calcined at 1050° C. to 1100° C. for two to six hours. The calcined material is then pulverized and doped with small amounts of La (0.1 to 0.5 wt. %) and/or Zn (0.4 to 1 wt. %) and/or Cu (0.1 to 1.0 wt. %) and/or Nb (0.1 to 0.8 wt. %) and/or Mn (0.1 to 1.0 wt. %) and/or Y (0 to 0.3 wt. %) and/or boric acid (0 to 1.25 wt. %), and a glass frit (lead boro alumino silicate) produced by Ferro Corporation under the designation PG 2765. This mixture is then fluxed, dried, and subjected to a size reduction process in a conventional manner using standard industrial techniques.

Each of three batches of a host material of the type noted above, and having the approximate weight percentages of 64.78% $BaCO_3$, 3.93% $CaCO_3$, 25.37% $TiO_2$, 5.91% $SnO_2$ and 2.0% of PbO, was doped with a different one of three dopants, thus producing three different low fired Y5V sample compositions identified hreinafter as samples $T_1$, $T_2$ and $T_3$. The following chart lists by approximate weight percentages the composition of the particular dopant used with each sample:

| Sample $T_1$ | Sample $T_2$ | Sample $T_3$ |
|---|---|---|
| 6% glass frit* | 6% glass frit* | 5.5% glass frit* |
| 0.1% $MnO_2$ | 0.15% $MnO_2$ | 0.15% MnO |
| 0.5% $La_2O_5$ | 0.5% $La_2O_5$ | 0.5% $La_2O_5$ |
| 1.0% ZnO | 0.75% ZnO | 0.75% ZnO |
| 0.3% Boric Acid | 0.25% CuO | 0.3% CuO |
|  | 0.2% $Nb_2O_5$ | 0.2% $Nb_2O_5$ |

*The glass frit in the above chart is that of the type noted above as being manufactured by Ferro Corporation under the designation EGD2765.

The above sample compositions were then used to make multi-layer capacitors using standard tape casting and building techniques, such as disclosed for example in the above-noted U.S. Pat. No. 5,361,187. These MLCC's were fired at 1130° C. for five hours in a box-type kiln. It was noticed that if the MLCC's were fired or soaked for six hours, or if the quantity of glass frit formed in the MLCC's was reduced slightly, the value of the dielectric constant tended to rise or increase to the range of 15,000 to 16,000. The following are some of the typical electrical characteristics exhibited by the above-noted MLCC's made from samples $T_1$, $T_2$ and $T_3$:

| S. No. | $K_{RT}$ | d.F. (%) | DIEL. THICKNESS | CURIE TEMP. C.° | TCC (%) at −30° C. | TCC (%) at +85° C. | RC (OHM-FAR) at 25° | RC (OHM-FAR) at 85° |
|---|---|---|---|---|---|---|---|---|
| $T_1$ | 9,612  | 2.22 | 0.74 mil. | 25 | −66 | −72 | 31,061 | 188 |
| $T_2$ | 12,802 | 0.61 | 1.1 mil.  | 20 | −71 | −75 | 35,814 | 4898 |
| $T_3$ | 13,944 | 0.90 | 1.07 mil. | 15 | −60 | −77 | 59,439 | 1385 |

It will be noted that the ionic size of barium in the barium/calcium-containing host compound, is greater than that of the calcium, while the molar ratio of (x+y) to (z+w), as noted above is greater than 1, and therefore non-stoichiometric. It appears, therefore, that the lead from the lead oxide, which is present in a substantially larger ratio, moves into the non-stoichiometric structure and replaces calcium, which thereby contributes to the promotion of grain growth, and in turn, contributes to a higher dielectric constant. In other words, the lead in the host material appears to function as a seed for nucleation sites, so that lead from the glass silicate reprecipitates into the structure assisting in the movement of calcium to interstitial sites and promoting overall cation balance in the sintered structure. Moreover, the alumina in the alumino silicate frit appears to promote the reaction of lead from the frit to the host structure. The result is the production of a low fire barium titanate composition which not only exhibits a high dielectric constant, but also permits the use of more inexpensive, low firing electrodes in the multi-layer capacitors manufactured from such compositions. In other words, instead of having to use high palladium content alloys in producing such electrodes for the capacitors, more inexpensive high silver content materials can be employed without substantially reducing the desired electrical characteristics of the resulting capacitors.

The glass frit referred to above under the designation EGD2765 has the following composition:

| Oxide | Wt. % |
|---|---|
| PbO | 56.30 |
| $Li_2O$ | 3.28 |
| $B_2O_3$ | 19.10 |
| $SiO_2$ | 7.12 |
| $Al_2O_3$ | 4.00 |
| $F_2$ | 4.17 |
|  | 100.03 |

While this invention has been described in detail in connection with only certain embodiments thereof, it will be apparent that it is capable of still further modification, and that this application is intended to cover any such modifications as may fall within the scope of one skilled in the art, or the appended claims.

We claim:

1. A dielectric ceramic composition in powder form capable of producing low fired multilayer capacitors meeting the Y5V standards of the EIA requiring that the temperature coefficient of capacitance must not change by more than +22% to −82% in the temperature range of −30° C. to +85° C., and consisting essentially of a non-stoichiometric host material produced in accordance with the formula $(Ba_xCa_y)$, $(Ti_zSn_w)$ $O_3$ +t % PbO, where t is in the range of greater than zero to approximately 2.0 wt. % and the molar ratio of $(Ba_x+Ca_y)$ to $(Ti_z+Sn_w)$ is greater than 1.0, wherein the mole fraction of x is in the approximate range of 0.90 to 0.92 of x+y and the mole fraction of z is in the approximate range of 0.86 to 0.89 of z+w, and doped with dopants consisting of a glass frit and one or more of boric acid and the oxides of La, Zn, Cu, Nb, Mn and Y.

2. A dielectric ceramic composition as defined in claim 1, wherein x+y equals approximately 1.03 moles and z+w equals 1.0 moles.

3. A dielectric ceramic composition as defined in claim 1, wherein said glass frit comprises a lead boro alumino silicate composition present in an amount of approximately 5.5 to 6.0 wt. %.

4. A dielectric ceramic composition as defined in claim 1, wherein the total wt. % of said dopants is in the approximate range of 7.0 to 8.0 wt. %.

5. A low fired multilayer ceramic capacitor made from a dielectric ceramic composition as defined in claim 1, and having a dielectric constant in the range of 12,000 to 16,000.

* * * * *